United States Patent
Nishino et al.

(10) Patent No.: US 12,511,185 B2
(45) Date of Patent: Dec. 30, 2025

(54) PROCESSOR SYSTEM AND FAILURE DIAGNOSIS METHOD

(71) Applicant: Hitachi, Ltd., Tokyo (JP)

(72) Inventors: Shuichi Nishino, Tokyo (JP); Yutaka Uematsu, Tokyo (JP); Tadanobu Toba, Tokyo (JP); Kenichi Shimbo, Tokyo (JP); Takumi Uezono, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 18/201,915

(22) Filed: May 25, 2023

(65) Prior Publication Data

US 2024/0004747 A1    Jan. 4, 2024

(30) Foreign Application Priority Data

Jun. 30, 2022    (JP) .................. 2022-106298

(51) Int. Cl.
*G06F 11/00* (2006.01)
*G06F 11/07* (2006.01)
*G06F 11/22* (2006.01)

(52) U.S. Cl.
CPC ........ *G06F 11/079* (2013.01); *G06F 11/0706* (2013.01); *G06F 11/0721* (2013.01); *G06F 11/2257* (2013.01)

(58) Field of Classification Search
CPC .............. G06F 11/079; G06F 11/0706; G06F 11/0721; G06F 11/0736; G06F 11/0739; G06F 11/0793; G06F 11/2257; G06N 5/02

See application file for complete search history.

(56) References Cited

U.S. PATENT DOCUMENTS

2020/0081445 A1* 3/2020 Stetson ............... B60W 60/001
2021/0390795 A1    12/2021 Toba et al.
(Continued)

FOREIGN PATENT DOCUMENTS

| JP | 2020-160867 A | 10/2020 |
| JP | 2020-160868 A | 10/2020 |
| JP | 2021-196678 A | 12/2021 |

OTHER PUBLICATIONS

Japanese-language Office Action issued in Japanese Application No. 2022-106298 dated Sep. 16, 2025, with English translation (8 pages).

*Primary Examiner* — Jason B Bryan
(74) *Attorney, Agent, or Firm* — Crowell & Moring LLP

(57) ABSTRACT

A processor system includes: one or more processors; and one or more memory resources. The memory resource is configured to store a diagnostic program configured to diagnose an electronic system including a mobile body or equipment, and a plurality of knowledge graphs for use in the diagnostic program and including at least a first knowledge graph and a second knowledge graph created based on domain knowledge different from that of the first knowledge graph. The processor is configured to execute the diagnostic program to (1) evaluate a semantic similarity between a first knowledge item included in the first knowledge graph and a second knowledge item included in the second knowledge graph, and (2) generate, when the similarity satisfies a predetermined condition, an integrated graph in which the first knowledge graph and the second knowledge graph are integrated.

9 Claims, 8 Drawing Sheets

(56) References Cited

U.S. PATENT DOCUMENTS

2022/0051110 A1* 2/2022 Bekkerman ............. G06F 18/29
2022/0075948 A1  3/2022 Yuan et al.
2022/0284740 A1* 9/2022 Loesch ................. G07C 5/006
2024/0144032 A1* 5/2024 Liang ....................... G06N 5/02

* cited by examiner

FIG. 5

EXAMPLE OF GIVING ID TO KNOWLEDGE ITEM

1-1
GRAPH ID   NODE ID

EXAMPLE OF SIMILARITY INFORMATION

| KNOWLEDGE ITEM 1 | KNOWLEDGE ITEM 2 | SIMILARITY |
|---|---|---|
| 1-1 | 2-1 | 0.0 |
| 1-2 | 2-1 | 0.0 |
| 1-3 | 2-1 | 0.95 |
| 2-1 | 1-1 | 0.0 |
| 2-2 | 1-4 | 0.0 |
| ⋮ | ⋮ | ⋮ |

PROCESSOR SYSTEM AND FAILURE DIAGNOSIS METHOD

BACKGROUND OF THE INVENTION

1. Field of the Invention

The present invention relates to a processor system and a failure diagnosis method.

2. Description of Related Art

In an electronic system related to a mobile body such as an automated vehicle or equipment such as a robot or a processing machine, factors that cause failures to occur are various due to an increase in the number of components of the system associated with advancement of automation and connected Internet of Things (IoT). For example, in an automated vehicle field, with advancement of connectivity and automated driving, failures due to an environment surrounding the vehicle or due to a connected system are increased. On the other hand, since knowledge related to failures (for example, a fault tree analysis (FTA) or service manuals) is vertically divided and distributed for respective specialized areas related to the electronic system (apparatus, environment, connected system, and the like), it is fairly difficult to diagnose a failure factor across various relevant areas.

In order to diagnose such a variety of failure factors, it is considered necessary to have a technique of summarizing knowledge related to failures in respective areas.

JP2021-196678A (PTL 1) discloses a distributed system that analyzes an abnormality factor or the like of an edge device which is a mobile body or equipment. Specifically, PTL 1 discloses that "The distributed system includes an edge device which is a mobile body or equipment capable of automated operation, and a diagnostic data computer. The edge device includes a moving mechanism or an operation mechanism for automated operation and an in-edge controller that controls the moving mechanism or the operation mechanism. The diagnostic data computer receives diagnostic data indicating an internal state in the in-edge controller."

CITATION LIST

Patent Literature

PTL 1: JP2021-196678A

SUMMARY OF THE INVENTION

In a case of attempting to diagnose a failure factor across various areas using, for example, a knowledge graph of each area, plural knowledge graphs exist due to complexity of the entire system surrounding the automated vehicle, and it is necessary to integrate the plural knowledge graphs for diagnosis.

On the other hand, each knowledge graph is created based on domain knowledge specific to a specialized field. Therefore, knowledge graphs created based on mutually different domain knowledge often have different notations of knowledge items having the same meaning due to domain differences in background specialized knowledge or errors in machine learning algorithms used for estimating the knowledge graphs. Therefore, it is fairly difficult to integrate the plural knowledge graphs.

PTL1 discloses that, as an analysis of data generated from the edge device, a fault tree analysis is performed using a knowledge graph for an abnormal factor and an influence range thereof. However, in the technique of PTL 1, an analysis using a knowledge graph for each area is performed. That is, the technique of PTL 1 does not consider integrating knowledge related to failures across areas and diagnosing a failure factor based on the integrated knowledge.

The invention is made in view of the above problems, and an object of the invention is to achieve a more accurate failure diagnosis by obtaining explicit knowledge having high comprehensiveness that can be applied to a failure diagnosis based on knowledge across a plurality of areas.

The present application includes a plurality of systems for solving at least a part of the above problems. An example of the systems is as follows. A processor system according to an aspect of the invention for solving the above problems includes: one or more processors; and one or more memory resources. The memory resource is configured to store a diagnostic program configured to diagnose an electronic system including a mobile body or equipment, and a plurality of knowledge graphs for use in the diagnostic program and including at least a first knowledge graph and a second knowledge graph created based on domain knowledge different from that of the first knowledge graph, and the processor is configured to execute the diagnostic program to (1) evaluate a semantic similarity between a first knowledge item included in the first knowledge graph and a second knowledge item included in the second knowledge graph, and (2) generate, when the similarity satisfies a predetermined condition, an integrated graph in which the first knowledge graph and the second knowledge graph are integrated.

According to the invention, it is possible to achieve a more accurate failure diagnosis by obtaining explicit knowledge having high comprehensiveness that can be applied to a failure diagnosis based on knowledge across a plurality of areas.

BRIEF DESCRIPTION OF THE DRAWINGS

FIG. 5 is a diagram illustrating an example of similarity information;

DESCRIPTION OF EMBODIMENTS

Hereinafter, an embodiment of the invention will be described with reference to the drawings.

Figure 1:
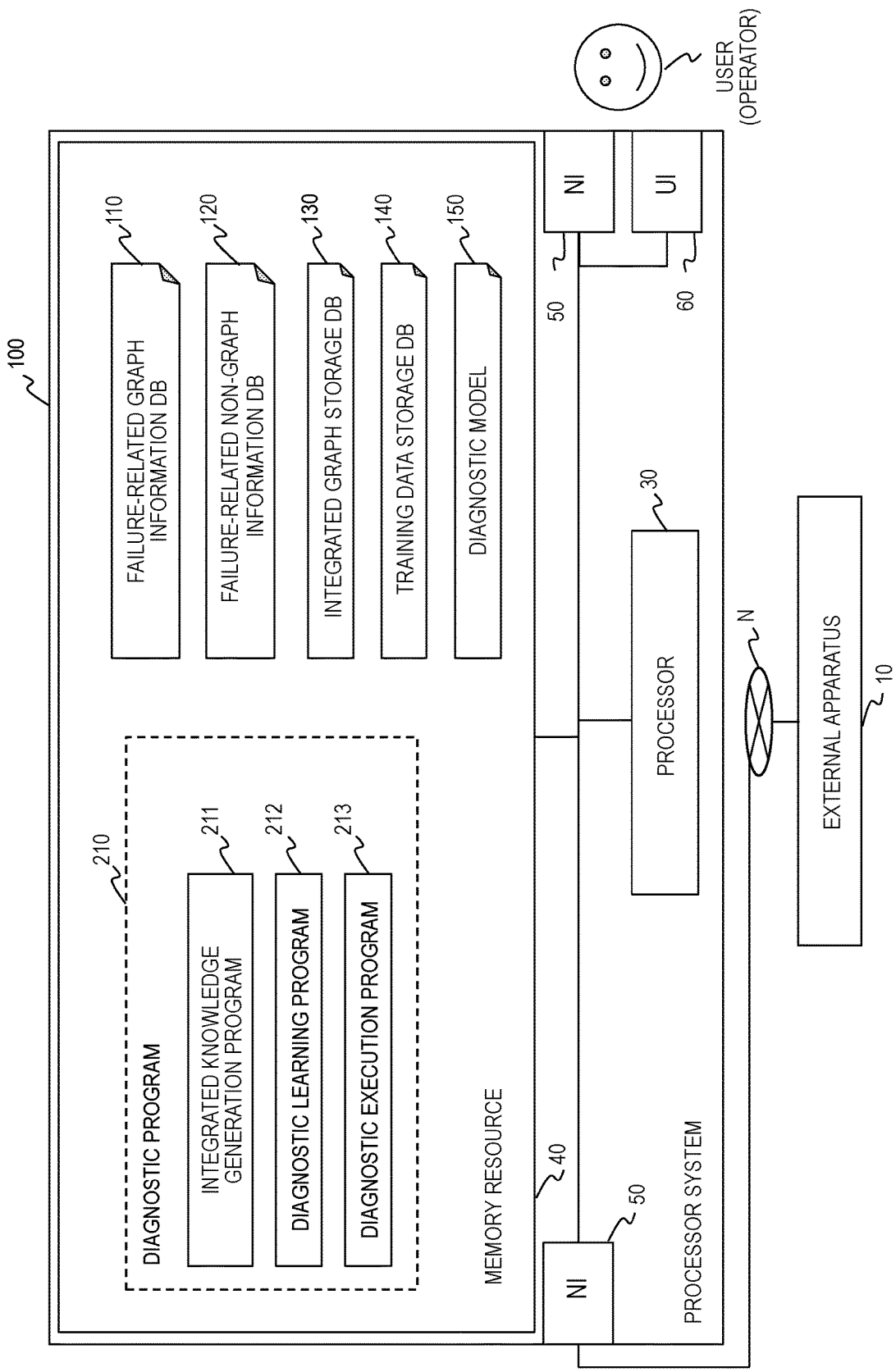
FIG. 1 is a diagram illustrating an example of a schematic configuration of a processor system.

FIG. 1 is a diagram illustrating an example of a schematic configuration of a processor system 100 according to the present embodiment. The processor system (hereinafter, may be referred to as the "present system") 100 is apparatus that diagnoses a failure occurred in an electronic system including equipment and a mobile body. Specifically, the present system 100 integrates knowledge graphs related to failures in respective specialized areas related to the equipment or the mobile body on which the electronic system is mounted (hereinafter, may be referred to as "areas"), based on a semantic similarity of knowledge items included in the knowledge graphs.

Further, the present system 100 generates training data used for machine learning of an information model for identifying a failure factor to be diagnosed (hereinafter, may be referred to as a "diagnostic model") using an integrated knowledge graph (hereinafter, may be referred to as an "integrated graph").

Further, the present system 100 obtains an identified failure factor as a diagnostic result by inputting, to the diagnostic model, information indicating a state of an occurred failure.

As described above, according to the present system 100, it is possible to generate an integrated graph in which knowledge of failures across various areas is summarized.

Further, according to the present system 100, it is possible to generate training data used for machine learning of a diagnostic model using an integrated knowledge graph generated across areas.

Further, according to the present system 100, it is possible to acquire a failure factor accurately identified as a diagnostic result based on a diagnostic model that performs machine learning on knowledge of failures across areas.

Although an object of the equipment or the mobile body on which the electronic system is mounted is not particularly limited, in the present embodiment, an example will be described in which the processor system 100 performs a diagnosis related to a failure of an electronic system mounted on an automated vehicle, which is a mobile body.

<Configuration of Processor System 100>

FIG. 1 is the diagram illustrating the example of the schematic configuration of the processor system 100. As illustrated, the present system 100 is intercommunicably connected to external apparatus 10 via, for example, a communication cable or a predetermined communication network (for example, the Internet, a local area network (LAN), or a wide area network (WAN)) N.

<<External Apparatus 10>>

The external apparatus 10 is apparatus that transmits input information to the processor system 100. Further, the external apparatus 10 is also apparatus that acquires information generated by the processor system 100. Specifically, the external apparatus 10 transmits failure-related information (graph information or non-graph information) to the processor system 100. Further, in addition to such information, the external apparatus 10 provides (transmits), to the processor system 100, various types of information used for processes executed by the processor system 100. Further, the external apparatus 10 acquires a diagnostic result identified by the processor system 100 from the processor system 100.

The external apparatus 10 includes a computer used by a business operator who receives a diagnostic service provided by the present system 100, such as a product manufacturing and maintenance business operator such as an automated vehicle manufacturer, and an infrastructure management business operator, a computer of a business operator who provides various types of useful information used for processes executed by the processor system 100, and the like. That is, the external apparatus 10 includes a plurality of types of computers in accordance with the types of information provided to the processor system 100.

<<Details of Processor System 100>>

The processor system 100 executes an integrated knowledge generation process of generating an integrated graph, a learning process of performing machine learning of a diagnostic model, and a diagnosis process of performing a failure diagnosis by reading various programs and information stored in a memory resource 40 by a processor 30. Details of respective processes will be described later.

The processor system 100 is a computer such as a personal computer, a tablet terminal, a smart phone, a server computer, and a cloud server, and is a system including at least one of these computers.

Specifically, the processor system 100 includes the processor 30, the memory resource 40, a network interface device (NI) 50, and a user interface device (UI) 60.

The processor 30 is an arithmetic device that reads various programs stored in the memory resource 40 and executes processes corresponding to respective programs. Examples of the processor 30 include a microprocessor, a central processing unit (CPU), a graphics processing unit (GPU), a field programmable gate array (FPGA), or other semiconductor devices capable of performing calculations.

The memory resource 40 is a storage device that stores various types of information. Specifically, the memory resource 40 is a non-volatile or volatile storage medium such as a random access memory (RAN) or a read only memory (ROM). The memory resource 40 may be a rewritable storage medium such as a flash memory, a hard disk, or a solid state drive (SSD), a universal serial bus (USB) memory, a memory card, or a hard disk.

The NI 50 is a communication device that performs information communication with the external apparatus 10. The NI 50 performs information communication with the external apparatus 10 via the predetermined communication network N such as a LAN or the Internet. Unless otherwise mentioned below, it is assumed that information communication between the processor system 100 and the external apparatus 10 is executed via the NI 50.

The UI 60 is an input device that inputs an instruction of a user (operator) to the processor system 100, and an output device that outputs information and the like generated by the processor system 100. Examples of the input device include a pointing device such as a keyboard, a touch panel, and a mouse, and a voice input device such as a microphone.

Further, examples of the output device include a display, a printer, and a voice synthesizer. Unless otherwise mentioned below, it is assumed that an operation of a user on the processor system 100 (for example, an input and an output of information, and an instruction to execute a process) is executed via the UI 60.

Further, a part or all of the configurations, functions, processing units, and the like of the present system 100 may be implemented by hardware, for example, by designing an integrated circuit. Further, a part or all of the functions of the present system 100 may be implemented by software or by cooperation of software and hardware. Further, the present system 100 may use hardware including a fixed circuit, or may use hardware at least a part of a circuit of which is changeable.

Further, the present system 100 may also be implemented by performing a part or all of functions and processes implemented by the respective programs by a user (operator).

Databases (DBs) and various types of information in the memory resource 40 described below may be a file or the like, or a data structure other than a database as long as it is a region in which data can be stored.

<<Failure-Related Graph Information DB 110>>

A failure-related graph information DB 110 is a database that stores failure-related graph information. The failure-related graph information is a knowledge graph useful for diagnosing a failure, and is information of a result of manually performing an analysis such as a failure mode and effect analysis (FMEA) or a fault tree analysis (FTA) on a target electronic system (that is, FMEA information and FTA information). Specifically, the failure-related graph information includes a node corresponding to a knowledge item related to a failure and a link indicating a relation therebetween.

Figure 2:
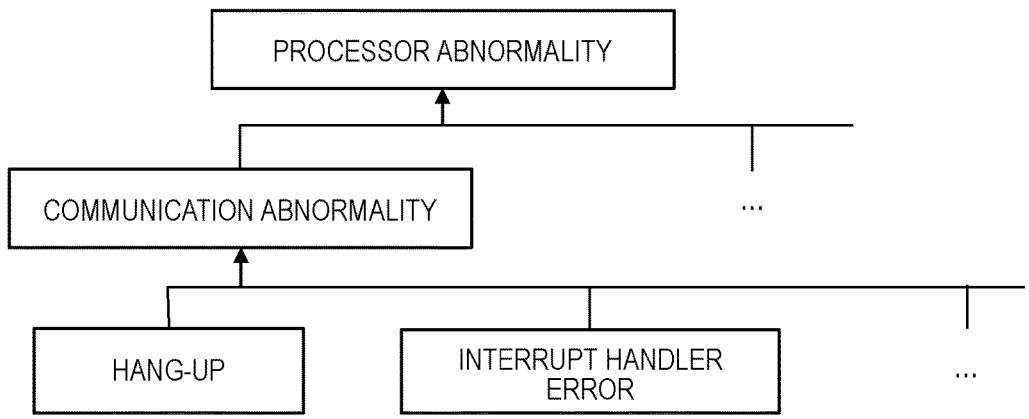
FIG. 2 is a diagram illustrating an example of a knowledge graph.

FIG. 2 is a diagram illustrating an example of the knowledge graph. In the illustrated knowledge graph, respective boxes representing a processor abnormality, a communication abnormality, a hang-up, and an interrupt handler error are knowledge items (nodes) related to a failure, and related knowledge items are connected by links (paths). A start point of an arrow of a link corresponds to a failure factor, an end point of the arrow corresponds to a failure result, and the link represents a relation indicating what factors may cause a failure.

Further, the relation between nodes is not limited to the arrows illustrated in FIG. 2, and for example, for a failure factor, a value indicating a probability or a degree of influence as a result of the failure may be associated as an element indicating a relation between nodes. Further, the knowledge graph is not limited to the illustrated notation, and may be notated by, for example, an array of knowledge items and an expression representing presence or absence of a relation between respective array elements.

Such failure-related graph information is an existing knowledge graph and is acquired from the external apparatus 10.

<<Failure-Related Non-Graph Information DB 120>>

A failure-related non-graph information DB 120 is a database that stores failure-related non-graph information. The failure-related non-graph information is information useful for diagnosing a failure, and is information that is not represented by a node or a link like failure-related graph information. Examples of the failure-related non-graph information include apparatus internal data, probe data, user information, environmental information, infrastructure information, and product information.

The apparatus internal data is information such as an error log output from an electronic control unit (ECU). Further, the probe data is, for example, position information during traveling or video information captured by a drive recorder. Further, the user information is, for example, inquiry information in which a complaint (comment) of a user related to a failure is recorded. Further, the environmental information is information indicating, for example, weather or a road surface condition during traveling. Further, the infrastructure information is information such as a server log when a connected service is used. Further, the product information is information such as a design document or a service manual of a product.

The processor system 100 acquires the failure-related graph information and the failure-related non-graph information from a business operator according to the type of information (for example, an automated vehicle manufacturer, an infrastructure management business operator, or a business operator providing environmental information) or a computer owned by an automated vehicle user (that is, the external apparatus 10).

<<Integrated Graph Storage DB 130>>

An integrated graph storage DB 130 is a database that stores an integrated graph in which knowledge graphs of a plurality of areas are integrated by processes executed by the processor system 100.

<<Training Data Storage DB 140>>

A training data storage DB 140 is a database that stores training data. The training data is data for training used for machine learning of a diagnostic model.

<<Diagnostic Model 150>>

A diagnostic model 150 is an information model for diagnosing a failure of the electronic system. Specifically, when information indicating a failure state is input, the diagnostic model 150 outputs a diagnostic result of a failure factor. The diagnostic model 150 is generated by performing machine learning using training data on a mathematical model such as a neural network or a support vector machine.

<<Diagnostic Program 210>>

A diagnostic program 210 is a program that diagnoses a failure factor. Further, the diagnostic program 210 includes a plurality of individual programs for executing processes of respective stages related to a failure factor diagnosis. Specifically, the diagnostic program 210 includes an integrated knowledge generation program 211, a diagnostic learning program 212, and a diagnostic execution program 213.

<<Integrated Knowledge Generation Program 211>>

The integrated knowledge generation program 211 is a program that executes an integrated knowledge generation process for generating an integrated graph. Specifically, the integrated knowledge generation program 211 executes a process of integrating knowledge graphs of respective areas created based on domain knowledge specific to a specialized field, based on a semantic similarity of knowledge items included in the respective knowledge graphs.

<<Diagnostic Learning Program 212>>

The diagnostic learning program 212 is a program that executes machine learning using training data on a predetermined mathematical model in generating the diagnostic model 150. Specifically, the diagnostic learning program 212 acquires training data from the training data storage DB 140, and performs machine learning using the training data on a mathematical model such as a neural network, thereby generating the diagnostic model 150 that enables a failure diagnosis based on knowledge across areas.

<<Diagnostic Execution Program 213>>

The diagnostic execution program 213 is a program that diagnoses a failure. Specifically, the diagnostic execution program 213 acquires information indicating a state of an occurred failure, and inputs the information to the diagnostic model 150, thereby acquiring a diagnostic result of an estimated failure factor.

The details of the processor system 100 were described above.

<Functional Configuration of Processor System 100>

Figure 3:
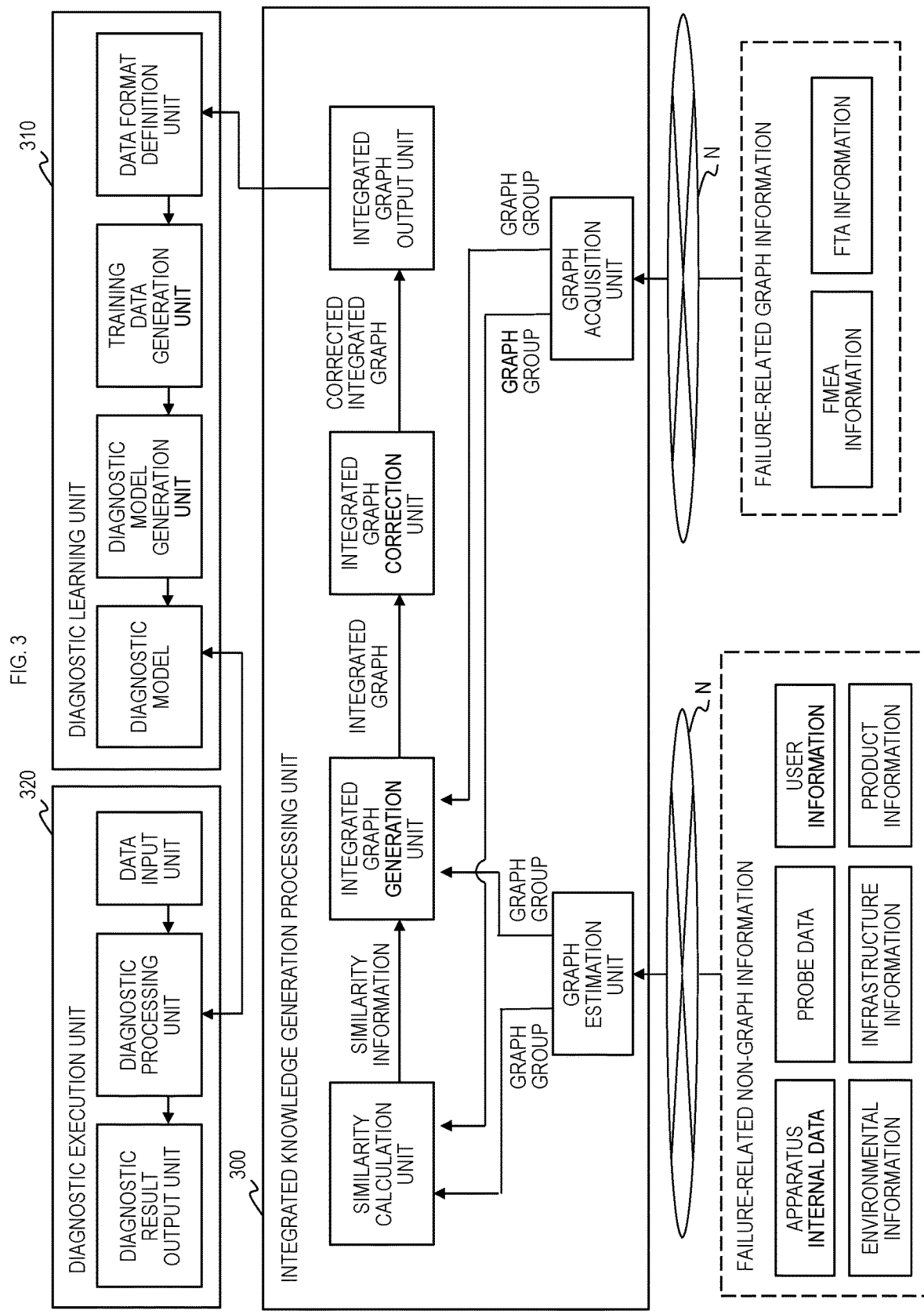
FIG. 3 is a diagram illustrating an example of a functional configuration of the processor system.

FIG. 3 is a diagram illustrating an example of a functional configuration of the processor system 100. The illustrated functional units are classified in accordance with main processing contents in order to facilitate understanding of functions implemented by reading the respective programs stored in the memory resource 40 by the processor 30. Therefore, the invention is not limited by methods of classifying the respective functions and names of the functional units.

An integrated knowledge generation processing unit 300 is a functional unit classified in order to facilitate understanding of a function implemented by reading the integrated knowledge generation program 211 by the processor 30. Further, the integrated knowledge generation processing unit 300 is further classified into a graph acquisition unit, a graph estimation unit, a similarity calculation unit, an integrated graph generation unit, an integrated graph correction unit, and an integrated graph output unit in accordance with processing contents.

Further, a diagnostic learning unit 310 is a functional unit classified in order to facilitate understanding of a function implemented by reading the diagnostic learning program 212 by the processor 30. Further, the diagnostic learning unit 310 is further classified into a data format definition unit, a training data generation unit, and a diagnostic model generation unit in accordance with the processing contents.

Further, a diagnostic execution unit 320 is a functional unit classified in order to facilitate understanding of a function implemented by reading the diagnostic execution program 213 by the processor 30. Further, the diagnostic execution unit 320 is further classified into a data input unit, a diagnostic processing unit, and a diagnostic result output unit in accordance with the processing contents.

A part of the respective functional units may be constructed by hardware implemented in the computer (for example, an integrated circuit including an ASIC). Further, processing of the respective functional units may be executed by one piece of hardware or may be executed by a plurality of pieces of hardware.

<Description of Processes>

Figure 4:
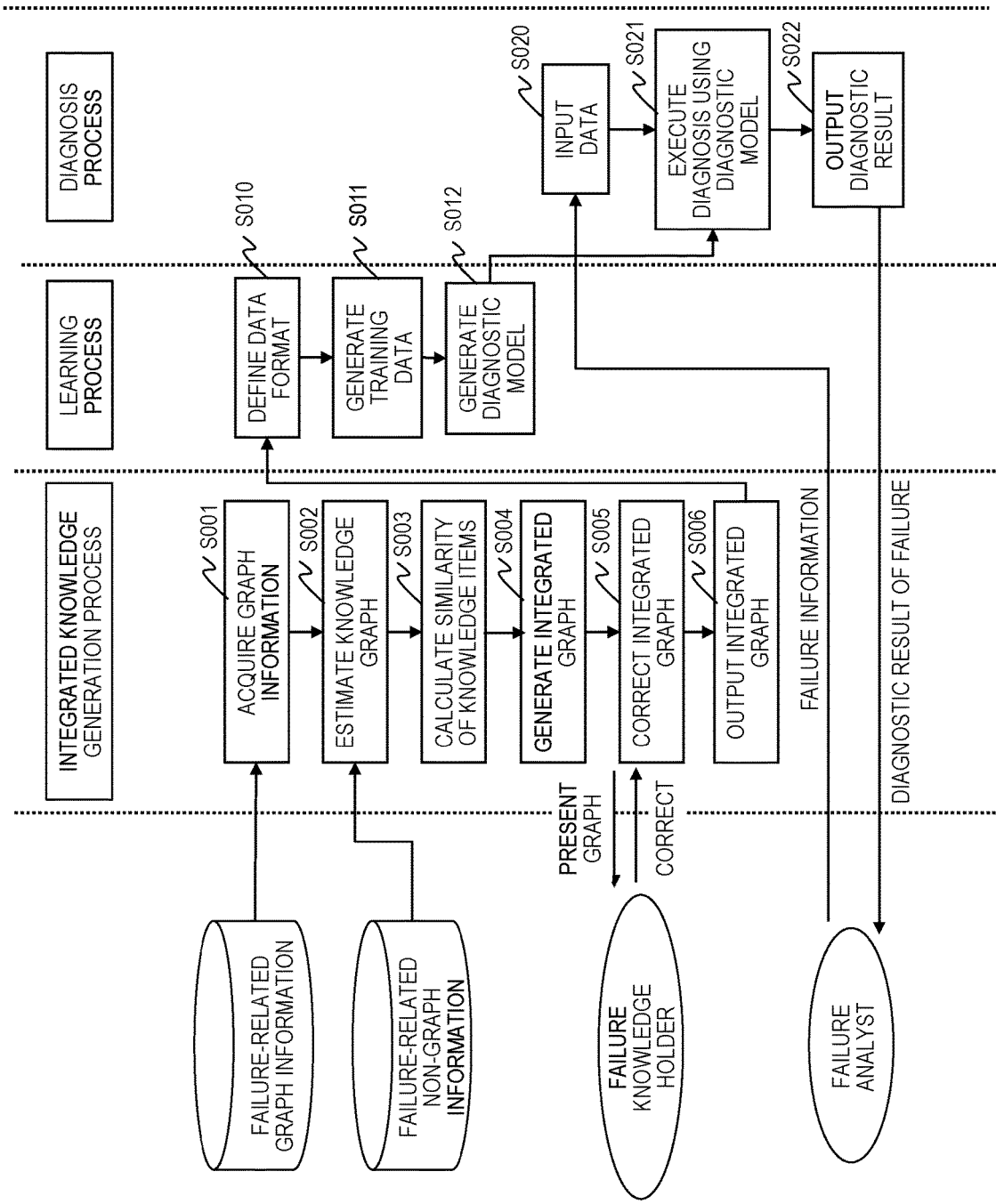
FIG. 4 is a flowchart illustrating an example of an integrated knowledge generation process, a learning process, and a diagnosis process.

FIG. 4 is a flowchart illustrating an example of an integrated knowledge generation process, a learning process, and a diagnosis process. Hereinafter, details of respective processes will be described in order. A subject of each process is the processor 30 that reads the programs stored in the memory resource 40, but in the description of the process, each functional unit implemented by the program is described as the subject of the process.

<<Integrated Knowledge Generation Process>>

The integrated knowledge generation process is started when the processor system 100 receives an execution instruction from the user (operator) and the processor 30 reads the integrated knowledge generation program 211.

When the process is started, the graph acquisition unit acquires failure-related graph information stored in the failure-related graph information DB 110 after being acquired from the external apparatus 10 (step S001). Specifically, the graph acquisition unit acquires, from the failure-related graph information DB 110, failure-related graph information represented by a knowledge graph such as FMEA information or FTA information.

The graph acquisition unit outputs, to the similarity calculation unit and the integrated graph generation unit, a graph group including a plurality of pieces of the acquired failure-related graph information.

Next, the graph estimation unit estimates a knowledge graph (step S002). Specifically, the graph estimation unit acquires failure-related non-graph information stored in the failure-related non-graph information DB 120 after being acquired from the external apparatus 10. More specifically, the graph estimation unit acquires, from the failure-related non-graph information DB 120, failure-related non-graph information that is not represented as a knowledge graph such as apparatus internal data, probe data, user information, environmental information, infrastructure information, and product information.

Further, the graph estimation unit estimates a knowledge graph from the acquired failure-related non-graph information. Specifically, the graph estimation unit estimates a knowledge graph corresponding to the acquired failure-related non-graph information by processing the failure-related non-graph information using a predetermined mathematical model such as a neural network. That is, the graph estimation unit generates a knowledge graph estimated from the acquired failure-related non-graph information using the mathematical model. Methods for estimating a knowledge graph using a mathematical model include, but are not limited to, the following methods.

A knowledge graph is estimated based on machine learning by using a mathematical model created by machine learning from the failure-related non-graph information.

When the failure-related non-graph information is text information, a mathematical model for extracting words related to a failure is applied, and a knowledge graph with the extracted words as knowledge items is generated based on a predetermined rule.

The graph estimation unit outputs, to the similarity calculation unit and the integrated graph generation unit, a graph group including a plurality of the estimated knowledge graphs. Further, the graph estimation unit stores a knowledge graph estimated (generated) from the failure-related non-graph information in the failure-related graph information DB 110.

Next, the similarity calculation unit calculates a similarity of knowledge items (step S003). Specifically, the similarity calculation unit identifies a knowledge graph included in the graph group acquired from the graph acquisition unit and the graph estimation unit. Further, the similarity calculation unit calculates a similarity between knowledge items in knowledge graphs generated (estimated) based on mutually different domain knowledge.

Specifically, the present system 100 holds, in the memory resource 40, a correspondence word dictionary in which semantic correspondence words related to, for example, notations of knowledge items (for example, a failure factor name), are registered, and the similarity calculation unit calculates a similarity between the knowledge items having a semantic correspondence relation instead of notational equivalence using the dictionary.

The similarity calculation method is not limited thereto, and the similarity calculation unit may cause, for example, an information model that performs natural language processing (for example, word2vec) to perform machine learning on a semantic similarity in notations of knowledge items, and calculate the similarity using the information model.

The similarity calculation unit generates similarity information in which the calculated similarity is registered. Specifically, the similarity calculation unit gives predetermined identification information (for example, a graph ID and a node ID) to the knowledge graph and the knowledge item, and generates similarity information in which the identification information including the graph ID of the knowledge graph and the node ID of the knowledge item and the calculated similarity are registered in association with each other.

FIG. 5 is a diagram illustrating an example of the similarity information. As illustrated, the similarity calculation unit generates identification information in which a graph ID, which is an identification ID of a knowledge graph, and a node ID, which is an identification ID of a knowledge item, are given to the respective knowledge graphs and knowledge items.

For example, identification information of a first knowledge item included in a first knowledge graph is "1-1". Further, for example, identification information of a second knowledge item different from the first knowledge item included in the first knowledge graph is "1-2". Further, for example, identification information of a first knowledge item included in a second knowledge graph different from the first knowledge graph is "2-1".

Further, in this way, the similarity calculation unit registers, in the similarity information, the identification information of the knowledge item and the calculated similarity between knowledge items in association with each other.

Returning to FIG. 4, description will be made. Next, the integrated graph generation unit generates an integrated graph (step S004). Specifically, the integrated graph generation unit identifies a pair of knowledge items whose similarity registered in the similarity information satisfies a predetermined condition (for example, the similarity is equal to or greater than a predetermined threshold). Further, the integrated graph generation unit generates, by integrating the identified pair of the knowledge items, an integrated graph in which knowledge graphs including the pair of knowledge items are integrated.

Figure 6:
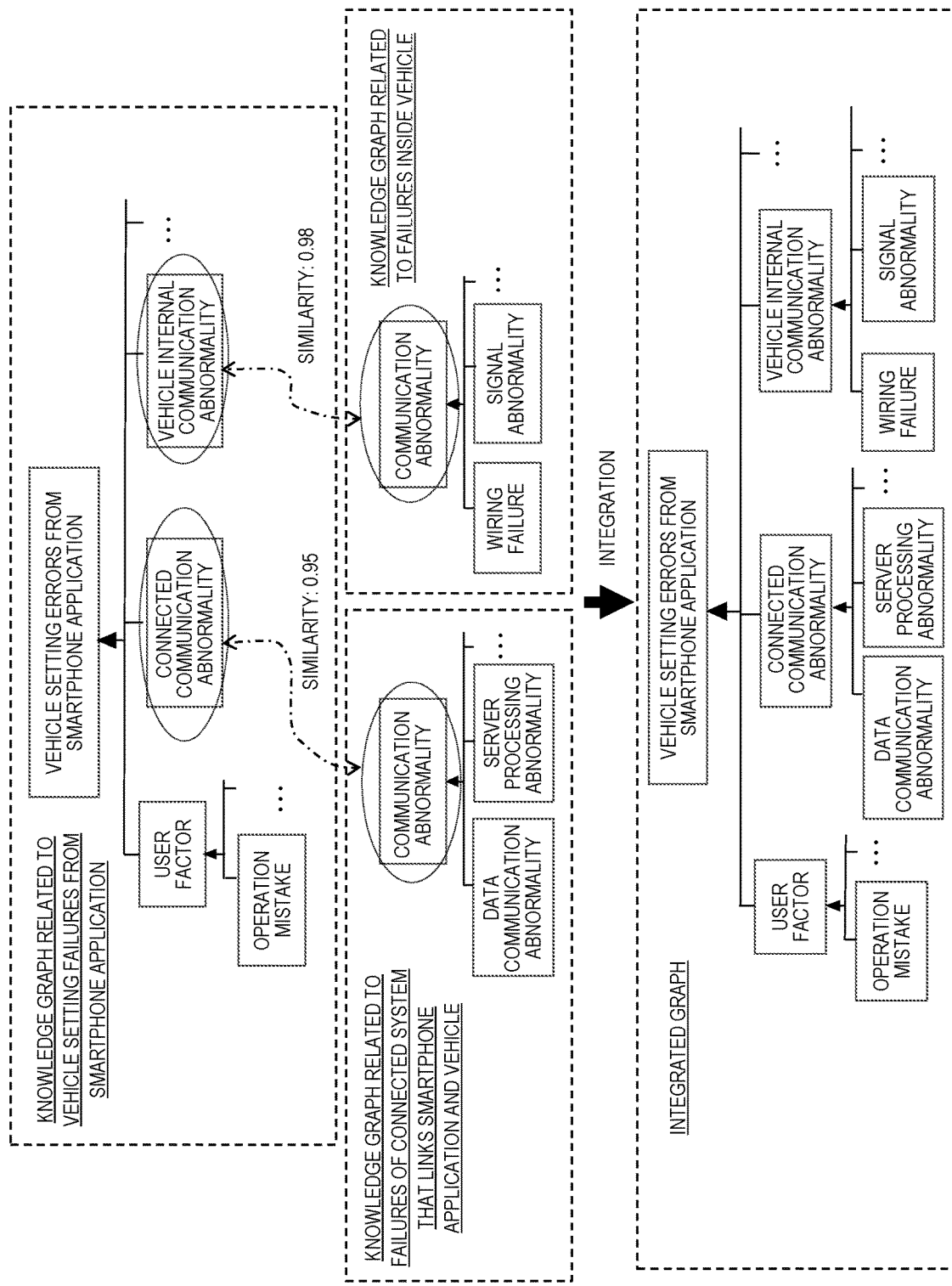
FIG. 6 is a diagram illustrating an example of generation of an integrated graph.

FIG. 6 is a diagram illustrating an example of generation of an integrated graph. The illustrated example indicates that a similarity between a knowledge item (connected communication abnormality) included in a knowledge graph related to a failure of vehicle setting from a smartphone application (for example, referred to as a first knowledge graph) and a knowledge item (communication abnormality) included in a knowledge graph related to a failure of a connected system that links the smartphone application and a vehicle (for example, referred to as a second knowledge graph) is 0.95 (semantically, the similarity of the same knowledge items is 1.0) and is equal to or greater than a predetermined threshold.

In this case, the integrated graph generation unit integrates the knowledge item in the first knowledge graph and the knowledge item in the second knowledge graph. Specifically, the integrated graph generation unit generates an integrated graph in which the second knowledge graph is integrated with the first knowledge graph by integrating knowledge items such that nodes under the knowledge item (communication abnormality) in the second knowledge graph are associated under the knowledge item (connected communication abnormality) in the first knowledge graph.

Further, the illustrated example indicates that a similarity between the knowledge item (vehicle internal communication abnormality) included in the first knowledge graph and a knowledge item (communication abnormality) included in a knowledge graph related to a failure inside the vehicle (for example, referred to as a third knowledge graph) is 0.98 and is equal to or greater than a predetermined threshold.

In this case, the integrated graph generation unit integrates the knowledge item in the first knowledge graph and the knowledge item in the third knowledge graph. Specifically, the integrated graph generation unit generates an integrated graph in which the third knowledge graph is integrated with the first knowledge graph by integrating knowledge items such that nodes under the knowledge item (communication abnormality) in the third knowledge graph are associated under the knowledge item (vehicle internal communication abnormality) in the first knowledge graph.

Further, integration of knowledge items is not necessarily limited to the above example (one-to-one integration between identified pairs of knowledge items). For example, for one knowledge item of a knowledge graph, a plurality of knowledge graphs including a plurality of knowledge items whose similarity is equal to or greater than a predetermined threshold may be integrated (a one-to-many relation).

Further, not all knowledge graphs are necessarily integrated into one integrated graph, and a plurality of integrated graphs may coexist.

Returning to FIG. 4, description will be made. Next, the integrated graph correction unit corrects the integrated graph (step S005). Specifically, the integrated graph correction unit displays the generated integrated graph on a display in the present system 100, and receives a correction instruction from an operator who has failure knowledge, for example. The correction instruction includes, for example, an instruction to change a relation between nodes included in the integrated graph (for example, delete or move nodes). Further, the integrated graph correction unit corrects the integrated graph based on the received correction instruction.

Next, the integrated graph output unit outputs the corrected integrated graph (step S006). Specifically, the integrated graph output unit stores the corrected integrated graph in the integrated graph storage DB 130, and outputs the corrected integrated graph to the data format definition unit.

An example of the integrated knowledge generation process was described above.

According to the present system 100 that executes such an integrated knowledge generation process, it is possible to obtain explicit knowledge (an integrated graph) having high comprehensiveness in which notational variations between knowledge items are absorbed and knowledge across a plurality of different areas is integrated based on a semantic similarity of the knowledge items.

Generally, it is difficult to integrate knowledge items in knowledge graphs created based on different domain knowledge due to notational variations. That is, although knowledge items in different knowledge graphs semantically point to the same target, it is often difficult to identify nodes pointing to the same target because notations of knowledge items are different in knowledge graphs created as different domain knowledge. On the other hand, the present system 100 calculates a semantic similarity by the above method, and integrates these knowledge items when the calculated similarity satisfies a predetermined condition (equal to or greater than a predetermined threshold). Accordingly, an integrated graph having higher comprehensiveness than a single knowledge graph can be generated.

Next, the learning process executed by the present system 100 will be described. This process is started when the data format definition unit acquires the integrated graph.

When the process is started, the data format definition unit defines a data format of the training data (step S010). Specifically, the data format definition unit identifies presence or absence of data corresponding to each knowledge item in the integrated graph. Here, the data corresponding to a knowledge item corresponds to, for example, when the knowledge item is a server processing abnormality, a server log in which an operation history of a server is recorded.

The presence or absence of the data corresponding to the knowledge item may be determined in advance in accordance with the knowledge item, for example. Further, for example, when the data is stored in the memory resource 40 in association with the knowledge item, the presence or absence of the data may be identified by searching the memory resource 40. Alternatively, when information indicating a correspondence relation between a knowledge item and presence or absence of corresponding data is stored in the memory resource 40, the presence or absence of the corresponding data may be identified using the information.

Further, when the corresponding data is present, the data format definition unit gives a data ID for identifying the data to the corresponding knowledge item. An example of the data ID is a data unique name or, when the data is stored in a database in memory resource 40, a column name or a field name. When the notations of the knowledge items include words such as " error" and " log", the data format definition unit automatically extracts the words by a regular expression or the like and gives the words as data IDs. The data ID may be manually input, for example.

Figure 7:
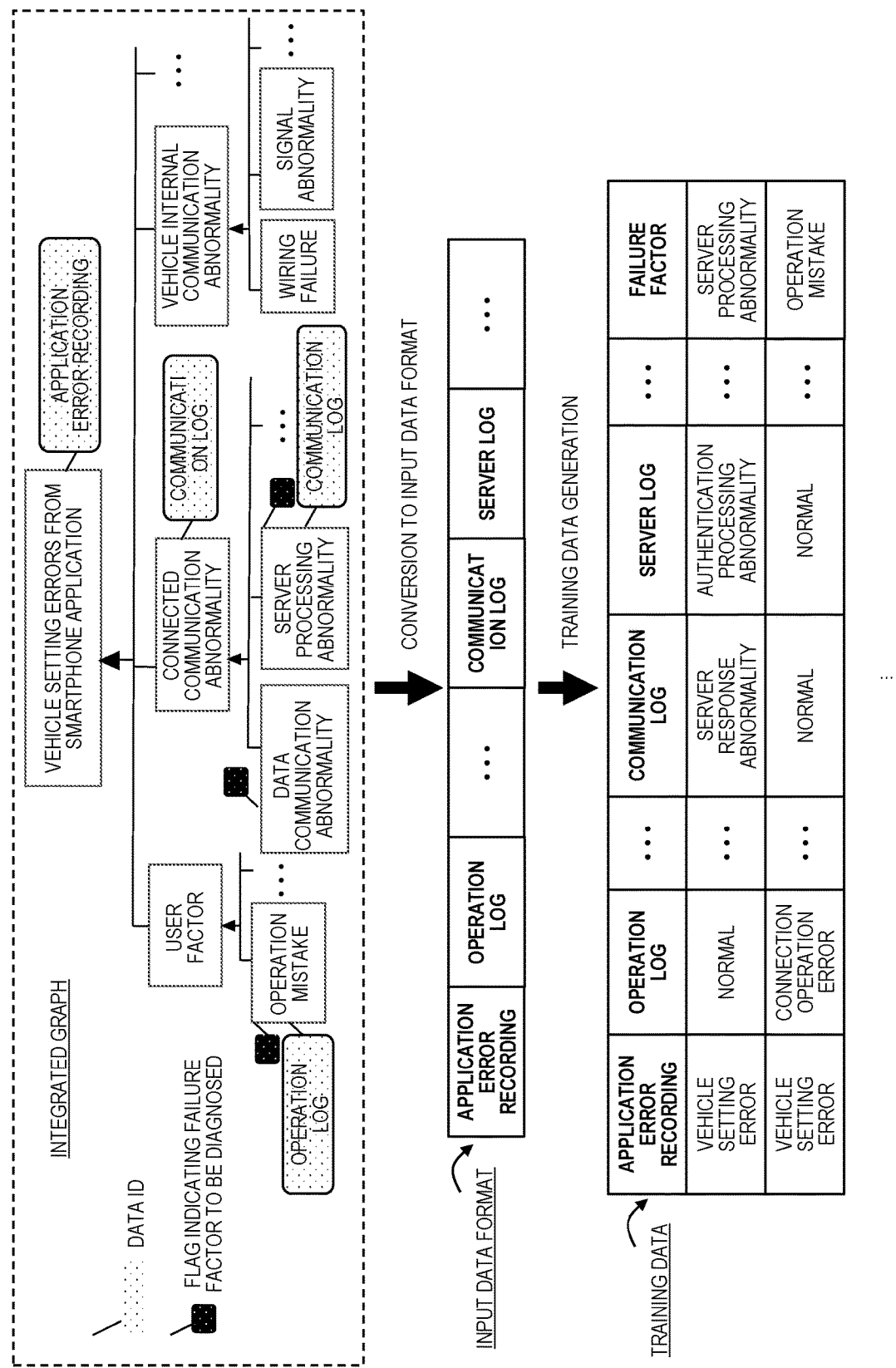
FIG. 7 is a schematic diagram related to definition of an input data format using the integrated graph.

FIG. 7 is a schematic diagram related to definition of an input data format using the integrated graph. As illustrated, knowledge items in the integrated graph are associated with data corresponding to the knowledge items. The data format definition unit gives data IDs (for example, an application error record, an operation log, and a communication log) to the knowledge items corresponding to the data by the above method.

Noted that, for example, an in-vehicle wiring abnormality (disconnection or the like) may not be captured as data as it is, and data corresponding to such a knowledge item may not exist. In this case, the data format definition unit associates information indicating that no corresponding data exists with the knowledge item or gives a data ID indicating another related data to the corresponding knowledge item. Another related data (for example, data of a communication error in a case of the wiring abnormality) may be determined in advance in accordance with the knowledge item.

Further, the data format definition unit identifies a knowledge item corresponding to a failure factor to be diagnosed from the integrated graph. For example, the data format definition unit regards knowledge items at ends of the integrated graph as fundamental failure factors, and identifies the knowledge items at the ends as knowledge items corresponding to the failure factors.

The method of identifying a knowledge item corresponding to a failure factor to be diagnosed from the integrated graph is not limited thereto, and for example, when there is a list in which a correspondence relation between the failure factor to be diagnosed and the corresponding knowledge item is defined, the data format definition unit may identify the knowledge item corresponding to the failure factor from the integrated graph using the list. The list may be stored in the memory resource 40 in advance. Alternatively, the knowledge item may be manually identified, for example.

Failure factors not to be diagnosed are excluded from processing targets. For example, when a failure that is found to be no problem inside the vehicle is to be analyzed, a "wiring failure" and a "signal abnormality" among the illustrated knowledge items are excluded from the failure factors.

Further, the data format definition unit extracts a data ID related to the identified failure factor and defines a list of the data IDs as the input data format. Specifically, the data format definition unit identifies the data ID of the corresponding data given to the knowledge item of the identified failure factor, and defines a list of the data IDs as the input data format.

For example, when the integrated graph has a tree structure (the illustrated example has a tree structure), the data format definition unit may select a path including a knowledge item of the identified failure factor in a path (link) from a top event (a root node) at a top level to an end event (a leaf node), and may define a list in which data IDs of corresponding data given to the knowledge item on the selected path are comprehensively extracted as the input data format. Alternatively, the data ID may be manually extracted, for example.

By the above processing, the input data format illustrated in FIG. 7 is defined.

Returning to FIG. 4, description will be made. Next, the training data generation unit generates training data (step S011). Specifically, the training data generation unit acquires, from failure case information in which a plurality of past failure cases are registered, a past failure case which is a case in which the knowledge item identified in the processing of step S011 is identified as the failure factor and includes data matching items defined in the input data format (the application error record, the operation log, the communication log, and the server log in the example of FIG. 7). The failure case information may be acquired from the external apparatus 10 or may be stored in advance in the memory resource 40 of the present system 100.

Further, the training data generation unit specifies, from the acquired failure case, data corresponding to respective items in the input data format, that is, state information corresponding to the respective item when a failure occurs (log information or the like), and a failure factor identified in the case (that is, the same failure factor as the failure factor identified in step S011). Further, the training data generation unit generates training data by allocating the identified state information to a corresponding item defined in the input data format and associating the failure factor identified by the case with a record including the respective items.

By the above processing, the training data illustrated in FIG. 7 is generated. As illustrated, in the training data, the state information when a failure occurs corresponding to the respective items in the input data format and the failure factor identified in the case are allocated. That is, the training data serves as data with a ground truth label in supervised learning.

Returning to FIG. 4, description will be made. Next, the diagnostic model generation unit generates the diagnostic model 150 that diagnoses a failure using the training data (step S012) Specifically, when information corresponding to respective items of the training data is input as information indicating a failure, the diagnostic model generation unit performs machine learning using the training data on the mathematical model to estimate a failure factor associated with the items. Accordingly, the diagnostic model generation unit generates a diagnostic model that diagnoses a failure and outputs a factor as a diagnostic result.

An example of the learning process was described above.

According to the present system 100 that executes such a learning process, it is possible to define an input data format having a higher correlation with respect to a larger number of failures by using an integrated graph including knowledge items across areas. Further, by generating the training data used for the machine learning of the diagnostic model 150 based on the past cases corresponding to the items defined in the input data format, it is possible to generate the diagnostic model 150 having high comprehensiveness and accuracy capable of analyzing a factor for more failures.

Next, the diagnosis process executed by the present system 100 will be described. The process is started when an execution instruction is received from an operator who is a failure analyst, for example.

When the process is started, the data input unit receives an input of information indicating a failure state (hereinafter, referred to as "failure information"). Specifically, the data input unit receives an input of failure information from the operator (step S020).

Next, the diagnostic processing unit executes a failure diagnosis using the diagnostic model 150 (step S021).

Specifically, the diagnostic processing unit inputs, to the diagnostic model 150, failure information received by the data input unit from the operator and including information corresponding to an item defined in the input data format, thereby acquiring a diagnostic result in which a failure factor is identified as an output value.

Next, the diagnostic result output unit outputs the diagnostic result in which the failure factor is identified (step S022). Specifically, the diagnostic result output unit outputs the diagnostic result including the identified failure factor to an output device such as the display in the present system 100. The diagnostic result output unit may output (transmit) the diagnostic result to the predetermined external apparatus 10.

An example of the diagnosis process was described above.

According to the present system 100 that performs such a diagnosis process, it is possible to obtain a diagnostic result having high comprehensiveness and accuracy capable of analyzing a factor for more failures.

In the present system 100, the functional units of the integrated knowledge generation processing unit 300, the diagnostic learning unit 310, and the diagnostic execution unit 320 do not necessarily need to be implemented by one processor system 100 (computer). For example, the respective functional units may be implemented by reading corresponding programs by processors of computers owned by different business operators. Alternatively, the integrated knowledge generation processing unit 300 and the diagnostic learning unit 310 may be implemented by one computer, or the integrated knowledge generation processing unit 300 and the diagnostic execution unit 320 may be implemented by one computer.

Further, the invention is not limited to the above embodiment, and various modifications are possible. The processor system 100 according to a modification updates the generated integrated graph every time new failure-related information is acquired, and generates an integrated graph having improved comprehensiveness. Specifically, when the new failure-related information is acquired, the integrated graph generation unit acquires the generated integrated graph from the integrated graph storage DB 130. Further, the integrated graph generation unit integrates a knowledge graph based on the newly acquired failure-related information (which may be either graph information or non-graph information) into an existing integrated graph in accordance with a similarity of knowledge items, thereby updating the existing integrated graph and generating an integrated graph having higher comprehensiveness.

Further, the diagnostic learning unit 310 generates training data using the updated integrated graph, and updates the diagnostic model 150 using the training data.

By such processing, the integrated knowledge generation processing unit 300 can update the existing integrated graph to an integrated graph having higher comprehensiveness. Further, the diagnostic learning unit 310 can update the diagnostic model 150 based on the updated integrated graph. Accordingly, the processor system 100 can further improve diagnostic accuracy by the diagnostic model 150.

<Service System to which Processor System 100 is Applied>

Figure 8:
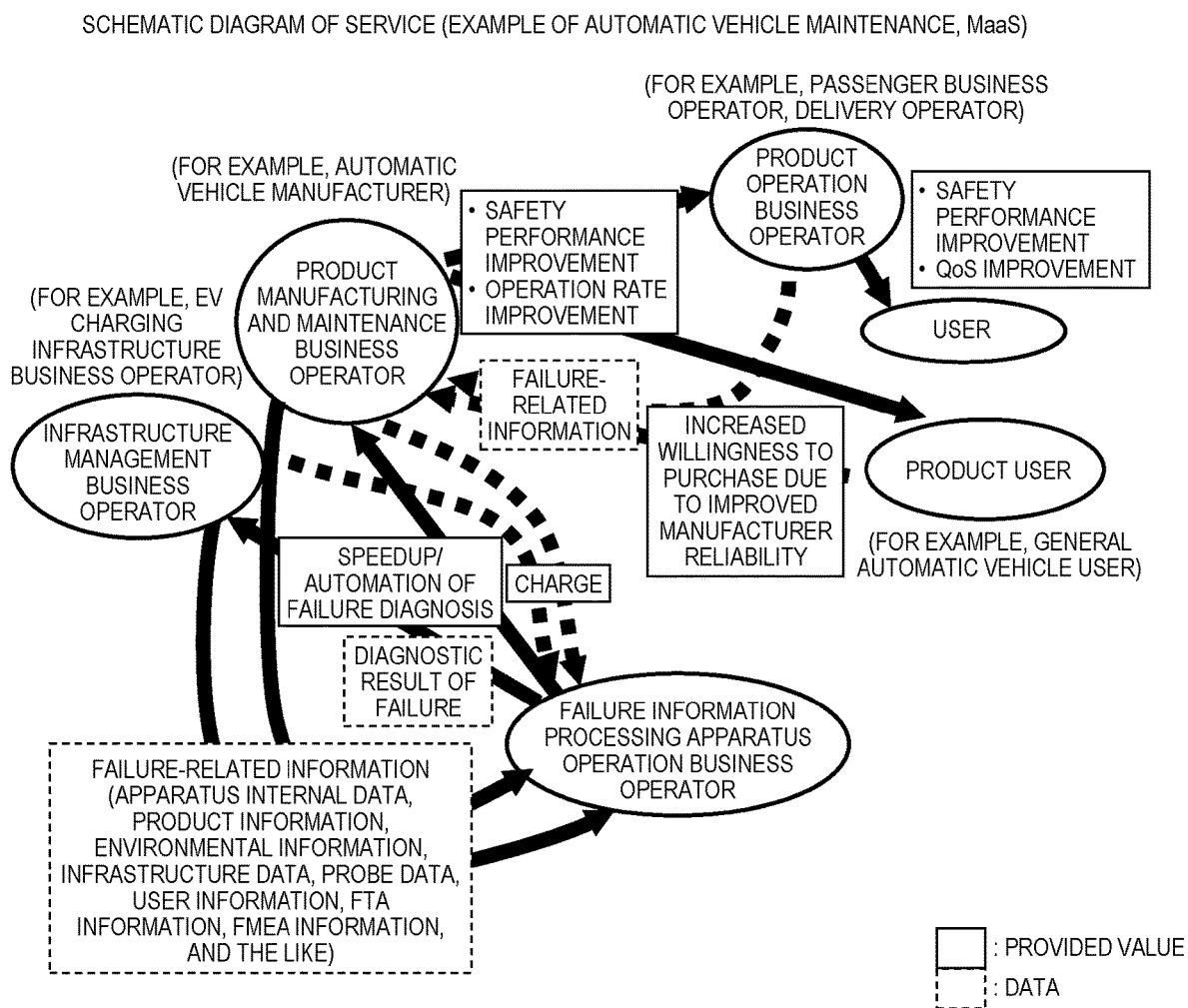
FIG. 8 is a diagram illustrating an example of an outline of a service system to which the processor system according to an embodiment is applied.

FIG. 8 is a diagram illustrating an example of an outline of a service system to which the processor system 100 according to the above embodiment is applied. The illustrated service form illustrates an example in which the invention is applied to a service for an automated vehicle.

The illustrated product manufacturing and maintenance business operator and infrastructure management business operator provide existing failure-related information (including information collected from a product operation business operator or a product user) to an operation business operator of the present system 100.

Further, the operation business operator of the present system 100 uses the processor system 100 to create explicit knowledge (an integrated graph) related to a failure diagnosis, and performs machine learning on training data generated using the integrated graph, thereby generating a diagnostic model having higher comprehensiveness and accuracy.

Further, the product manufacturing and maintenance business operator and the infrastructure management business operator provide failure information whose factor is unidentified to the operation business operator of the present system 100.

Further, the operation business operator of the present system 100 inputs the provided failure information to the diagnostic model, obtains a diagnostic result in which the failure factor is identified, and replies to the product manufacturing and maintenance business operator and the infrastructure management business operator.

With such a configuration of the service system, the product manufacturing and maintenance business operator and the infrastructure management business operator do not need to perform manual analysis, and can obtain a benefit of speeding up analysis.

Accordingly, a product purchaser and a product operation business operator can obtain various benefits such as improvement in safety performance and improvement in operation rate. Further, along with this, the manufacturer can enjoy a benefit of improving reliability of the product.

Further, the product manufacturing and maintenance business operator can obtain a benefit of increasing purchase motivation of users accompanying the improvement of the manufacturer reliability.

Further, the operation business operator of the present system 100 can enjoy a benefit of obtaining a consideration (a charge in this figure) for the failure diagnosis from the product manufacturing and maintenance business operator and the infrastructure management business operator.

The operation business operator of the present system 100 may collect the failure-related information from a plurality of product manufacturing and maintenance business operators or component suppliers, and may aggregate and use the failure-related information. Accordingly, the processor system 100 can create an integrated graph having higher comprehensiveness and accuracy.

Further, the invention is not limited to the above embodiment and modifications, and includes various modifications within a scope of the same technical idea. For example, the above embodiment is described in detail for easy understanding of the invention, and the invention is not necessarily limited to those including all of the configurations described above. Further, a part of a configuration of one embodiment can be replaced with a configuration of another embodiment, and a configuration of another embodiment can be added to the configuration of the one embodiment. Further, a part of the configuration of each embodiment may be added to, deleted from, or replaced with another configuration.

Further, in the above description, control lines and information lines are those that are considered necessary for the description, and not all the control lines and the information lines on the product are necessarily illustrated. In practice, it may be considered that almost all configurations are connected to each other.

What is claimed is:

1. A processor system comprising:
one or more processors, each of which includes an application specific integrated circuit; and
one or more memory resources, wherein the one or more memory resources is/are configured to store
a diagnostic program configured to diagnose an electronic system including a mobile body or an equipment, and
a plurality of knowledge graphs for use in the diagnostic program and including at least a first knowledge graph and a second knowledge graph created based on domain knowledge different from that of the first knowledge graph, and
the one or more processors is/are configured to execute the diagnostic program to
(1) evaluate, via machine learning, a semantic similarity between a first knowledge item included in the first knowledge graph and a second knowledge item included in the second knowledge graph,
(2) generate, when the semantic similarity satisfies a predetermined condition, an integrated graph in which the first knowledge graph and the second knowledge graph are integrated, and
(3) diagnose a failure in the mobile body or the equipment based on the integrated graph.

2. The processor system according to claim 1, wherein the processor is configured to execute the diagnostic program to
apply a predetermined mathematical model to failure-related information acquired from an external apparatus to generate the first knowledge graph and the second knowledge graph based on the failure-related information.

3. The processor system according to claim 2, wherein the memory resource is configured to store the generated integrated graph, and
the processor is configured to execute the diagnostic program to
apply, when new failure-related information is acquired, the predetermined mathematical model to the new failure-related information to generate a third knowledge graph based on the new failure-related information, and
integrate the integrated graph and the third knowledge graph based on a semantic similarity between a knowledge item included in the integrated graph acquired from the memory resource and a third knowledge item included in the third knowledge graph.

4. The processor system according to claim 1, further comprising:
an output device configured to display information; and
an input device configured to receive an input of information, wherein
the processor is configured to execute the diagnostic program to
display on the output device the generated integrated graph, and
correct the integrated graph based on correction contents of the integrated graph received via the input device.

5. The processor system according to claim 1, wherein the processor is configured to execute the diagnostic program to
identify a knowledge item included in the integrated graph and corresponding to a failure factor to be diagnosed, and
define an input data format of training data for causing a predetermined mathematical model for diagnosis to perform machine learning by itemizing identification information of data corresponding to the identified knowledge item.

6. The processor system according to claim 5, wherein the processor is configured to execute the diagnostic program to
identify, from a past failure factor case, data that matches with an item defined in the input data format and indicates a state corresponding to the item when a failure occurs, and generate training data in which the identified data is allocated to a corresponding item.

7. The processor system according to claim 6, wherein the processor is configured to execute the diagnostic program to
generate, when information corresponding to the item is input as information indicating a failure, a diagnostic model that diagnoses a failure in the electronic system by performing machine learning using the training data on the predetermined mathematical model such that a failure factor associated with the item is estimated.

8. The processor system according to claim 7, wherein the processor is configured to execute the diagnostic program to
(1) acquire, from a terminal of a product manufacturing and maintenance business operator or an infrastructure management business operator, failure information with an unidentified failure factor, and input the failure information to the diagnostic model to acquire an identified failure factor as a diagnostic result, and
(2) transmit the identified failure factor to the terminal of the product manufacturing and maintenance business operator or the infrastructure management business operator.

9. A failure diagnosis method executed by a processor system including one or more processors, each of which includes an application specific integrated circuit, and one or more memory resources, the method comprising:
storing, by the one or more memory resources,
a diagnostic program configured to diagnose an electronic system including a mobile body or an equipment, and
a plurality of knowledge graphs for use in the diagnostic program and including at least a first knowledge graph and a second knowledge graph created based on domain knowledge different from that of the first knowledge graph; and
by executing the diagnostic program by the one or more processors including the application specific integrated circuit,
(1) evaluating, via machine learning, a semantic similarity between a first knowledge item included in the first knowledge graph and a second knowledge item included in the second knowledge graph, (2) generating, when the semantic similarity satisfies a predetermined condition, an integrated graph in which the first knowledge graph and the second knowledge graph are integrated, and
(3) diagnosing a failure in the mobile body or the equipment based on the integrated graph.

* * * * *